(12) United States Patent
Nagy et al.

(10) Patent No.: US 12,337,670 B2
(45) Date of Patent: Jun. 24, 2025

(54) ELECTRIC VEHICLE DRIVE MODULE COOLING

(71) Applicant: BorgWarner Inc., Auburn Hills, MI (US)

(72) Inventors: Attila Nagy, Fishers, IN (US); Andrew Dragon, Fishers, IN (US)

(73) Assignee: BorgWarner Inc., Auburn Hills, MI (US)

( * ) Notice: Subject to any disclaimer, the term of this patent is extended or adjusted under 35 U.S.C. 154(b) by 443 days.

(21) Appl. No.: 17/942,628

(22) Filed: Sep. 12, 2022

(65) Prior Publication Data
US 2024/0083231 A1  Mar. 14, 2024

(51) Int. Cl.
*B60K 1/00* (2006.01)
*B60K 11/02* (2006.01)
*H02K 9/19* (2006.01)

(52) U.S. Cl.
CPC ............... *B60K 1/00* (2013.01); *B60K 11/02* (2013.01); *H02K 9/19* (2013.01); *B60K 2001/006* (2013.01)

(58) Field of Classification Search
CPC .... B60K 1/00; B60K 11/02; B60K 2001/006; H02K 9/19; H02K 1/32; H02K 7/006; H02K 7/116; H02K 5/203
USPC ...................................................... 310/54, 52
See application file for complete search history.

(56) References Cited

U.S. PATENT DOCUMENTS

| | | | | |
|---|---|---|---|---|
| 4,644,202 A | * | 2/1987 | Kroy | F04D 13/0666 310/90 |
| 2006/0113851 A1 | * | 6/2006 | Ishihara | B60L 3/003 310/52 |
| 2016/0164378 A1 | * | 6/2016 | Gauthier | H02K 9/19 310/54 |
| 2018/0076687 A1 | * | 3/2018 | Pritchard | H02K 11/33 |
| 2024/0083231 A1 | * | 3/2024 | Nagy | H02K 7/116 |
| 2024/0380281 A1 | * | 11/2024 | Pawar | H02K 9/19 |

* cited by examiner

*Primary Examiner* — Ahmed Elnakib
(74) *Attorney, Agent, or Firm* — Reising Ethington P.C.

(57) ABSTRACT

A drive module is employed for use in a hybrid electric vehicle (HEV) powertrain or in a battery electric vehicle (BEV) powertrain. The drive module serves to propel movement of the accompanying hybrid electric vehicle or battery electric vehicle. In an implementation, the drive module includes a housing, an electric motor, a gear assembly, a coolant sump, and a coolant passage. The electric motor has a stator and a rotor. The rotor has a shaft. The gear assembly has its movement driven by the shaft. The coolant passage resides in a wall of the housing. Amid use, coolant is drawn from the coolant sump via the coolant passage.

18 Claims, 5 Drawing Sheets

is not shown in preview due to length limits …

ELECTRIC VEHICLE DRIVE MODULE COOLING

TECHNICAL FIELD

The present application relates to drive modules equipped in hybrid electric vehicle (HEV) powertrains and in battery electric vehicle (BEV) powertrains and, more particularly, to cooling measures employed in such drive modules.

BACKGROUND

Automotive hybrid and battery electric vehicles are commonly equipped with drive modules to drive rotation of their wheels and for propulsion of the vehicles. Depending in part on the larger powertrain architecture, drive modules typically include an electric motor and speed reducer and/or differential assembly, and can further include a cooling and lubrication system. The electric motors often have a rotor and a stator. The rotor is caused to rotate, while the stator remains static with respect to the rotor. Rotation of the rotor usually drives rotation of a drive shaft in these arrangements. Significant heat is often generated at the electric motors. The cooling systems distribute coolant among components of the electric motors in order to dissipate the heat.

SUMMARY

In one implementation, an electric vehicle drive module may include a housing, an electric motor, a gear assembly, a coolant sump, and a coolant passage. The electric motor resides within the housing. The electric motor has a stator and a rotor. The rotor has a shaft. The gear assembly is driven to rotate by the rotor's shaft. The coolant sump is established in the housing. The coolant passage resides in a wall of the housing. The coolant passage is in fluid communication with the rotor's shaft, and is in fluid communication with the coolant sump. Amid use of the electric vehicle drive module, coolant is drawn from the coolant sump and through the coolant passage.

In another implementation, a method of providing coolant in an electric motor of an electric vehicle drive module may include multiple steps. One step involves providing a first volumetric flow rate of coolant to the electric motor via a pump. The pump works to pump coolant from a coolant sump of the electric vehicle drive module and to a coolant circuit of the electric motor. Another step involves drawing coolant from the coolant sump through a coolant passage via rotation of a rotor shaft of the electric motor. The coolant passage is in fluid communication with the coolant circuit. Yet another step involves providing a second volumetric flow rate of coolant to the coolant circuit by way of the pump. The second volumetric flow rate is provided after coolant is drawn from the coolant sump through the coolant passage via rotation of the rotor shaft of the electric motor. The second volumetric flow rate of coolant is less than the first volumetric flow rate of coolant.

In yet another implementation, an electric vehicle drive module may include a housing, an electric motor, a gear assembly, a coolant sump, a coolant passage, a lower pressure zone, and a pump. The housing has an interior wall, an end wall, or has both an interior wall and an end wall. The electric motor resides within the housing, and has a stator and a rotor. The rotor has a shaft. The gear assembly is rotationally driven by the rotor's shaft. The coolant sump is established in the housing. The coolant passage resides in the interior wall, in the end wall, or in both the interior wall and the end wall. The coolant passage is in fluid communication with the coolant sump and with a coolant circuit of the electric motor. The lower pressure zone is contiguous with the shaft. The lower pressure zone is in fluid communication with the coolant passage. The pump is in fluid communication with the coolant sump. The pump works to pump coolant fluid from the coolant sump and to the coolant circuit of the electric motor.

DETAILED DESCRIPTION

Figure 1:
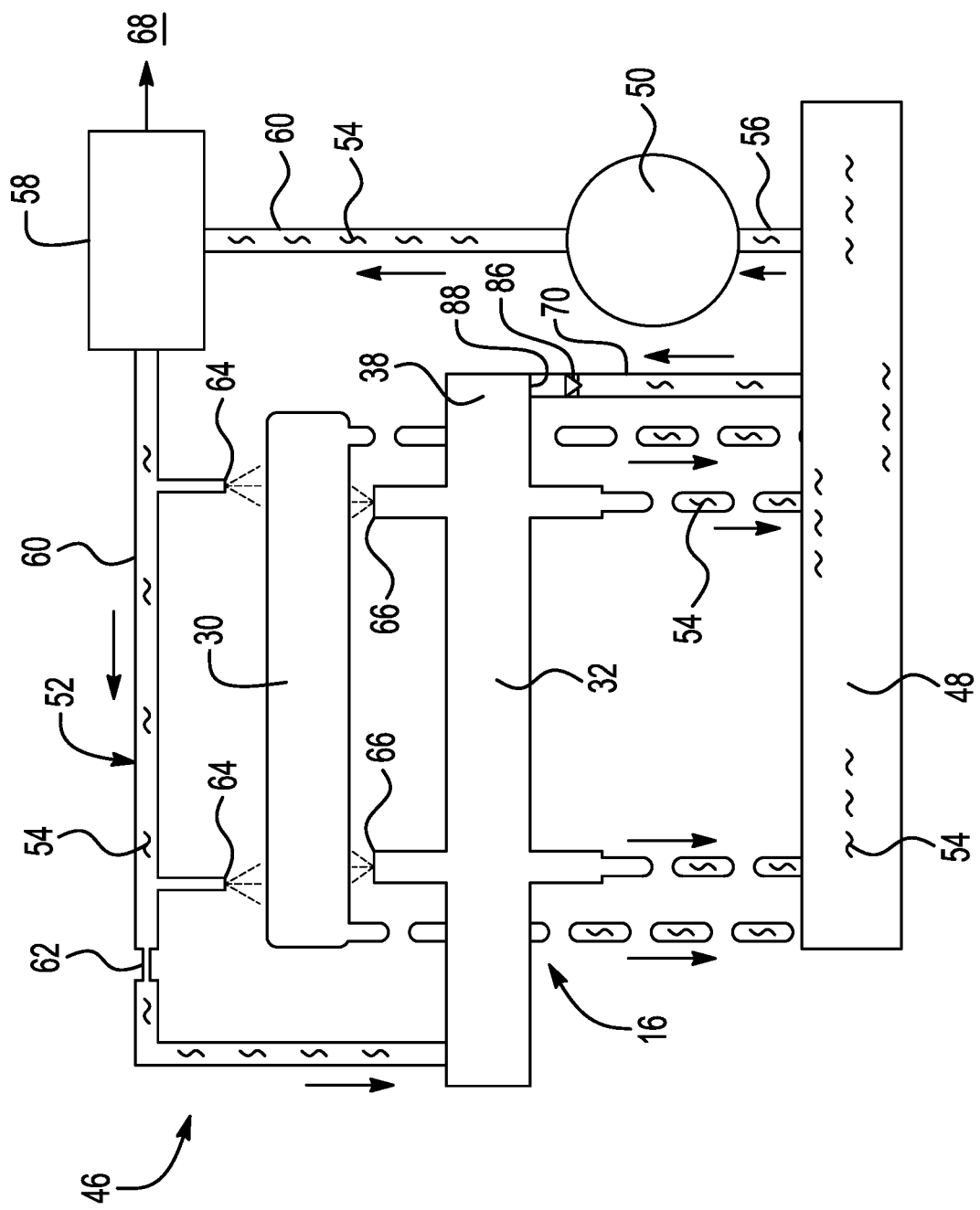
FIG. 1 presents a schematic layout of an embodiment of a coolant circuit of an electric vehicle drive module.

Embodiments of an electric vehicle drive module 10 with augmented rotor cooling measures are presented in the figures and detailed in this description. Unlike previous arrangements, rotation of a rotor of the electric vehicle drive module 10 takes part in, and directly effects, the supply of coolant among components of the electric vehicle drive module 10. Increased volumetric flow rate of coolant among the components results, along with an enhanced cooling effectiveness and efficiency at the rotor and at a stator of the electric vehicle drive module 10. Pumping that moves coolant through parts of the electric vehicle drive module 10 can be throttled when the increased coolant flow is supplied by the rotor's rotation, or can be otherwise reduced or halted altogether, per various embodiments. Overall system efficiencies in the electric vehicle drive module 10 can hence be improved, ultimately improving energy consumption from an accompanying vehicle battery.

Further, as used herein and unless otherwise specified, the terms axially, radially, and circumferentially, and their related grammatical forms, are used in reference to the generally circular and cylindrical shape of the shown electric motor and some of its components. In this sense, axially refers to a direction that is generally along or parallel to a central axis of the circular and cylindrical shape, radially refers to a direction that is generally along or parallel to a radius of the circular and cylindrical shape, and circumferentially refers to a direction that is generally along or in a similar direction as a circumference of the circular and cylindrical shape. Also, the terms downstream and upstream are used herein with respect to coolant flow directions from the coolant sump, such that downstream refers to coolant flow in a direction moving from the coolant sump, while upstream refers to coolant flow in an opposite direction. And, the phrase fluidly communicate and its related grammatical forms are used herein to refer to the facility of fluid flow (e.g., coolant flow) between and among relevant components and locations.

The electric vehicle drive module 10, in general, can be equipped in hybrid electric vehicle (HEV) powertrains and in battery electric vehicle (BEV) powertrains, according to different automotive applications. The electric vehicle drive module 10 serves to drive rotation of wheels for a hybrid electric or a battery electric vehicle. The electric vehicle drive module 10 can exhibit various designs and constructions, and can have various components, according to different embodiments and depending upon its application. Its components are integrated together in a larger packaged unit. In the embodiment of the figures, and with reference to FIG. 2, the electric vehicle drive module 10 includes, as its main components, a power electronics assembly 12, a gear assembly 14, and an electric motor 16; still, the electric vehicle drive module 10 could have more, less, and/or different components in other embodiments. Further, a housing 18 is provided to support and mount the components of the electric vehicle drive module 10 together. The housing 18 can be made-up of a multitude of walls 20, casings, plates, and/or other structures—depending on the embodiment—that can be connected to one another such as via bolting or via another connection technique. In particular, the housing 18 has a main portion and wall 22 surrounding the electric motor 16, and an interior wall 24 spanning radially to a shaft (introduced below) of the electric motor 16 and situated axially in-between the electric motor 16 and the gear assembly 14. An end wall 26 of the housing 18 is situated on an opposite side of the electric motor 16 with respect to the gear assembly 14.

Figure 2:
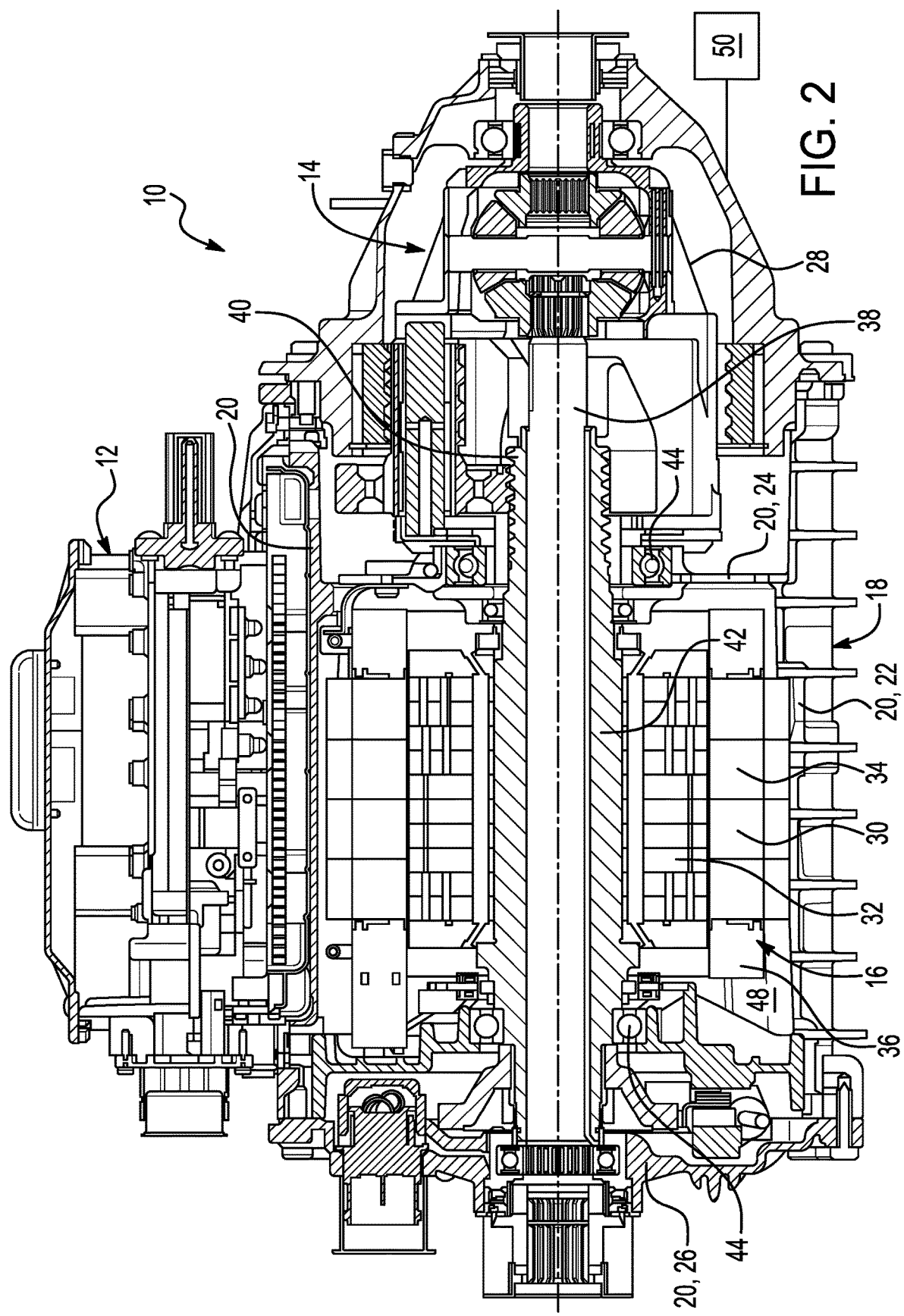
FIG. 2 is a sectional view of an embodiment of the electric vehicle drive module.

The power electronics assembly 12 is used to control and convert electrical power in the electric vehicle drive module 10. The power electronics assembly 12 can include one or more of the following components: an onboard charger, a controller, an inverter, and a converter, among other possibilities. The gear assembly 14 serves to transfer rotation and torque from the electric motor 16 and to an output shaft. The output shaft can be connected to an axle shaft of a wheel of the accompanying vehicle. The gear assembly 14 can have various designs, constructions, and components per different embodiments and dictated in part or more on the architecture of the powertrain in which the electric vehicle drive module 10 is equipped. In the embodiment of FIG. 2, the gear assembly 14 has a co-axial arrangement with the shaft of the electric motor 16 and is in the form of a planetary gear set and a differential. The planetary gear set can include a sun gear, multiple planet gears, a ring gear, and a planet carrier. For the wheels driven to rotate by the electric vehicle drive module 10, the differential serves to permit faster rotation of one wheel than another amid a vehicle turn. Further, as illustrated in FIG. 2, a gear assembly housing 28 is provided to house the gear assembly 14. The gear assembly housing 28 can be mounted to the housing 18. Still, in other embodiments, the gear assembly 14 could have more, less, and/or different components than presented here. For example, rather than the co-axial arrangement depicted in FIG. 2, the gear assembly 14 could have an off-axis arrangement relative to the shaft of the electric motor 16.

The electric motor 16 serves to provide the rotation and torque that ultimately drives rotation of the vehicle wheels. The electric motor 16 imparts movement and rotation to the gear assembly 14 and resides within the housing 18. The electric motor 16 can have various designs, constructions, and components per different embodiments and dictated in part or more on the architecture of the powertrain in which the electric vehicle drive module 10 is equipped. The electric motor 16 can be an alternating current (AC) motor, and can be a synchronous motor. In the embodiment of the figures, and with continued reference to FIG. 2, the electric motor 16 includes a stator 30 and a rotor 32, as its main components. The stator 30 receives electricity from a vehicle battery via the power electronics assembly 12, causing the rotor 32 to rotate while the stator 30 remains static relative thereto. The stator 30 has a multitude of windings 34 with winding ends 36, and the rotor 32 has a shaft 42. The shaft 42 rotates when the electric motor 16 is activated, and drives movement and rotation of the gear assembly 14 using an input gear portion 40 of the shaft 42. In the embodiment of FIG. 2, the shaft 42 has a through-shaft arrangement with an internal shaft 38; still, in other embodiment the shaft 38 could have other arrangements that lack the internal shaft 38. Further, bearings 44 can be provided at various locations to support and facilitate rotation of certain components amid employment of the electric vehicle drive module 10. Still, in other embodiments, the electric motor 16 could be of other types of motors, and could have more, less, and/or different components than presented here.

Excessive heat is often generated by the electric motor 16 amid use of the electric vehicle drive module 10, which can ultimately degrade performance. In order to dissipate the heat, past electric vehicle drive modules were outfitted with cooling systems that distributed coolant to certain parts and locations of its electric motor. The cooling systems could include a coolant supply, a coolant pump, and a series of passages and spray bars near stators of the electric motors, among other possibilities. While sufficient in certain circumstances, it has been observed that increased cooling is often beneficial and that the coolant pump can constitute an inefficient use of energy in the overall systems.

With reference to FIGS. 1 and 2, the electric vehicle drive module is outfitted with a cooling system 46 in order to dissipate the generation of heat at the electric motor 16 and elsewhere and among other components of the electric vehicle drive module 10. According to this embodiment, the cooling system 46 includes a coolant sump 48, a coolant pump 50, and a coolant circuit 52; still, in other embodiments the cooling system 46 could have more, less, and/or different components. The coolant sump 48 is established in the housing 18 and holds a supply of coolant fluid 54. The coolant fluid 54 can be in the form of oil. The coolant sump 48 is defined at an interior of the housing 18 and by one or more of the walls 20. The coolant fluid 54 may make its way to, and/or settle at, the coolant sump 48 at different times during use and during non-use of the electric vehicle drive module 10. The coolant pump 50 works to pump the coolant fluid 54 from the coolant sump 48 and through the coolant circuit 52. A pump supply passage 56 can fluidly communicate with the coolant sump 48 and with the coolant pump 50. The coolant pump 50 also fluidly communicates with the coolant circuit 52 which can be situated downstream of the coolant pump 50. The coolant circuit 52, per this embodiment, includes a distribution box 58, coolant gallery passages 60, a constriction 62, stator sprays 64, rotor sprays 66, and a rotor feed passage (not shown) which feeds coolant fluid from the pump 50 to the rotor 32; still, in other embodiments the coolant circuit could have other configurations with more, less, and/or different components. The coolant fluid 54 is distributed throughout the coolant circuit 52. From the distribution box 58, the coolant fluid 54 can travel downstream for auxiliary purposes such as to the gear assembly 14 (represented by reference numeral 68 in FIG. 1) in the electric vehicle drive module 10 and travels downstream via the coolant gallery passages 60 to the stator sprays 64 for discharge thereat and through the constriction 62. The discharge via the stator sprays 64 can be aimed at the winding ends 36, per an example. Further downstream, the coolant fluid 54 travels to and through rotor passages and to the rotor sprays 66 for discharge thereat. The rotor passages can reside interiorly of the rotor 32 to distribute the coolant fluid 54 among rotor laminations, among other possibilities.

In order to increase the volumetric flow rate of the coolant fluid 54 in the cooling system 46—and particularly to the rotor 32—for enhanced cooling effectiveness and efficiency of the electric motor 16, a coolant passage 70 is introduced. The coolant passage 70 more directly and immediately fluidly communicates the shaft 42 of the rotor 32 and the rotor's cooling infrastructure and the coolant sump 48 together. The coolant fluid 54 in the coolant sump 48 can hence more directly and more immediately flow to the rotor 32 via the coolant passage 70, as set forth below in more detail. The coolant passage 70 can constitute a part of the larger cooling system 46. The coolant passage 70 resides in the housing 18 and spans at least partly between the shaft 42 and the coolant sump 48, with an inlet 72 fluidly communicating with the coolant sump 48. An outlet 74 of the coolant passage 70 is located downstream of the inlet 72 and fluidly communicates with coolant passages of the rotor 32. The coolant passage 70 can have various designs and constructions in different embodiments, depending in part upon the design and construction and components of the electric vehicle drive module 10. The coolant passage 70 resides in, and is hence defined at least in part by, one or more of the walls 20 of the housing 18. In at least some embodiments, the wall(s) that define the coolant passage 70 also define the coolant sump 48.

Figure 3:
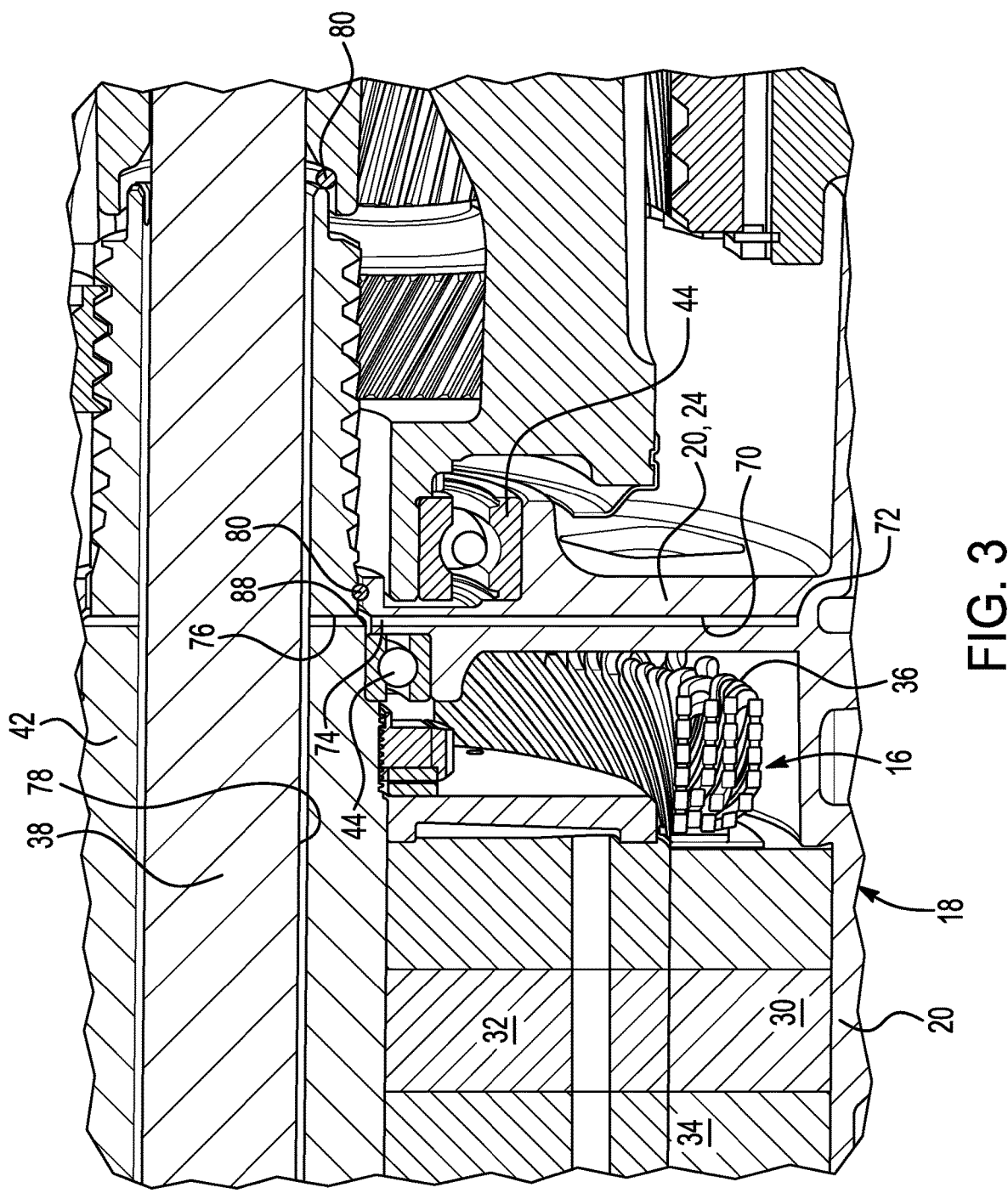
FIG. 3 is a cut-away sectional view of the electric vehicle drive module, showing a first embodiment of a coolant passage.
Figure 4:
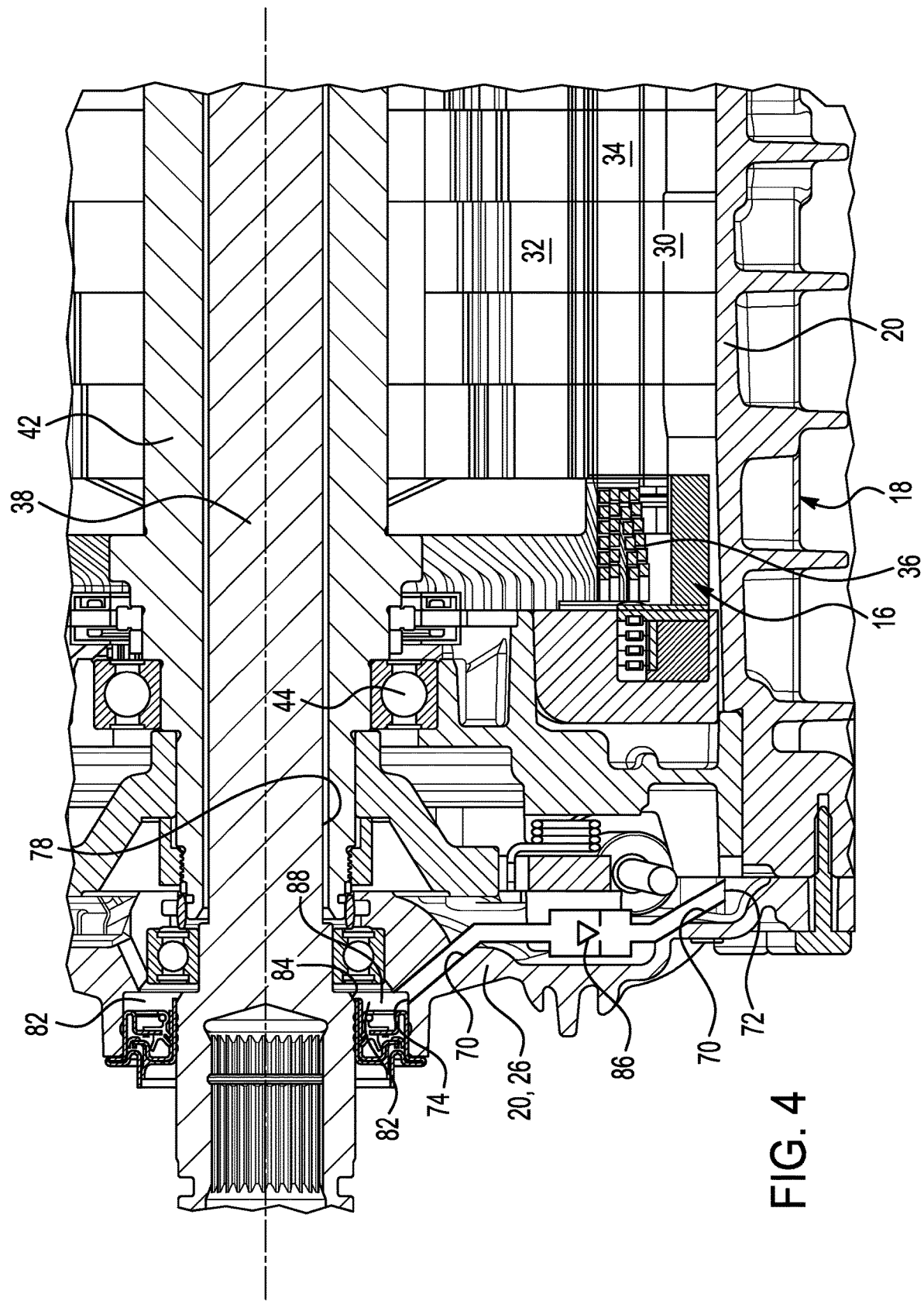
FIG. 4 is a cut-away sectional view of the electric vehicle drive module, showing a second embodiment of the coolant passage.

FIGS. 3 and 4 present example embodiments of the coolant passage 70. In the embodiment of FIG. 3, the coolant passage 70 resides in the interior wall 24 and spans vertically therein from the coolant sump 48 to the shaft 42 (vertically is used here with reference to the orientation of the electric vehicle drive module 10 in FIG. 2). At the inlet 72, the coolant passage 70 is open to the coolant sump 48 in order to accept and receive the coolant fluid 54 within the coolant passage 70. At the outlet 74, the coolant passage 70 fluidly communicates with a second coolant passage 76 for the flow of the coolant fluid 54 thereto. The second coolant passage 76 resides in the shaft 42 and is arranged in-line with the coolant passage 70. Downstream of the second coolant passage 76, the coolant fluid 54 travels to a third coolant passage 78 at the internal shaft 38. The third coolant passage 78 resides at an inside of the shaft 42. From there, the coolant fluid 54 is distributed to and through the rotor passages and to the rotor sprays 66. Furthermore, seals 80 can be disposed near a junction of the coolant passages 70, 76, and at a junction at an axial end of the shaft 42, both to preclude unwanted coolant leakage according to this embodiment. Between the inlet 72 and outlet 74, per this embodiment, the coolant passage 70 exhibits a linear and radial path (radial is used here relative to the cylindrical shape of the shaft 42). In other embodiments in which the shaft 42 lacks an internal shaft, the coolant passage 70 could fluidly communicate directly with the third coolant passage 78.

In the embodiment of FIG. 4, the coolant passage 70 resides in the end wall 26 and spans therein from the coolant sump 48 to the shaft 42, particularly to the internal shaft 38. At the inlet 72, the coolant passage 70 is open to the coolant sump 48 in order to accept and receive the coolant fluid 54 within the coolant passage 70. At the outlet 74, the coolant passage 70 fluidly communicates with a cavity 82 for delivering flow of the coolant fluid 54 thereto. The cavity 82 is partly established by a surface of the end wall 26 and an outer surface 84 of the internal shaft 38. Downstream of the cavity 82, the coolant fluid 54 makes its way to the third coolant passage 78 for distribution to and through the rotor passages and to the rotor sprays 66. Further, per this embodiment, the cavity 82 is pressurized by the coolant pump 50 and receives the coolant fluid 54 downstream of the distribution box 58 via the coolant gallery passages 60. Between the inlet 72 and outlet 74, the coolant passage 70 exhibits a non-linear path with multiple bends therealong.

Furthermore, in this embodiment, a check valve 86 is situated and disposed within the coolant passage 70. The check valve 86 is positioned downstream of the inlet 72 and upstream of the outlet 74. The check valve 86 permits the flow of the coolant fluid 54 through the coolant passage 70 in a downstream direction from the inlet 72 and to the outlet 74, and prevents the flow of the coolant fluid 54 in the opposite, upstream direction from the outlet 74 and to the inlet 72. Unwanted backflow to the coolant sump 48 is hence precluded via the check valve 86. It has been observed that backflow may occur when the coolant passage 70 is not influenced by a lower pressure condition and the coolant fluid 54 is not flowing downstream of the inlet 72, as set forth below. Further, a check valve could also be implemented in the coolant passage 70 of the embodiment of FIG. 3. Still, in other embodiments, the coolant passage 70 could reside in other walls of the housing 18 and/or there could be more than a single coolant passage 70 such as having both of the coolant passages 70 of FIGS. 3 and 4 in the same housing 18.

During use of the electric vehicle drive module 10, the coolant fluid 54 is drawn from the coolant sump 48 and to the rotor 32 via the coolant passage 70. Without intending to be limited to a particular theory of causation, it is thought that rotation of the shaft 42 and pressure differential between coolant flow pumped to the rotor passages via the coolant pump 50 and entering the rotor 32, and coolant flow exiting the rotor 32 such as via the rotor sprays 66 or otherwise, contribute to and induce a condition in which the coolant fluid 54 flows through the coolant passage 70. Centrifugal forces experienced by the coolant fluid 54 in the rotor 32 amid its rotational motion are also thought to influence coolant fluid flow through the coolant passage 70. Internal restrictions within the rotor 32—some intended, some perhaps not—limit the coolant flow exiting the rotor 32 compared to pumped coolant flow available for entry in the rotor passages.

A lower pressure zone 88, or negative pressure zone, can be produced as a consequence. The lower pressure zone 88 works to draw the coolant fluid 54 through the coolant passage 70. The lower pressure zone 88 can develop downstream of the coolant passage 70 and fluidly communicates with the coolant passage 70. The fluid communication can be direct and immediate without intervening voids and/or passages, or can be indirect such as by way of intervening voids and/or passages residing downstream of the coolant passage 70, according to various embodiments. Once developed, the accompanying lower pressure condition of the lower pressure zone 88 serves to pull the coolant fluid 54 from the coolant sump 48 and through the coolant passage 70. In the embodiment of FIGS. 3 and 4, the lower pressure zone 88 can reside contiguous with the internal shaft 38, such as adjacent the outer surface 84 and adjacent an outer diameter of the internal shaft 38, and can reside contiguous with the shaft 42, such as adjacent an outer diameter of the shaft 42. In FIG. 3, for example, the lower pressure zone 88 can be located adjacent the outlet 74 and downstream of the second coolant passage 76, or can at least subject these locations to the lower pressure condition. In FIG. 4, as another example, the lower pressure zone 88 can be located downstream of the outlet 74 and adjacent the cavity 82, or can at least subject these locations to the lower pressure condition. The lead lines of FIGS. 3 and 4 for the lower pressure zone 88, in this regard, are intended to indicate approximations of sites subject to the lower pressure condition, and are not necessarily precise and sole locations of the lower pressure zone 88.

Figure 5:
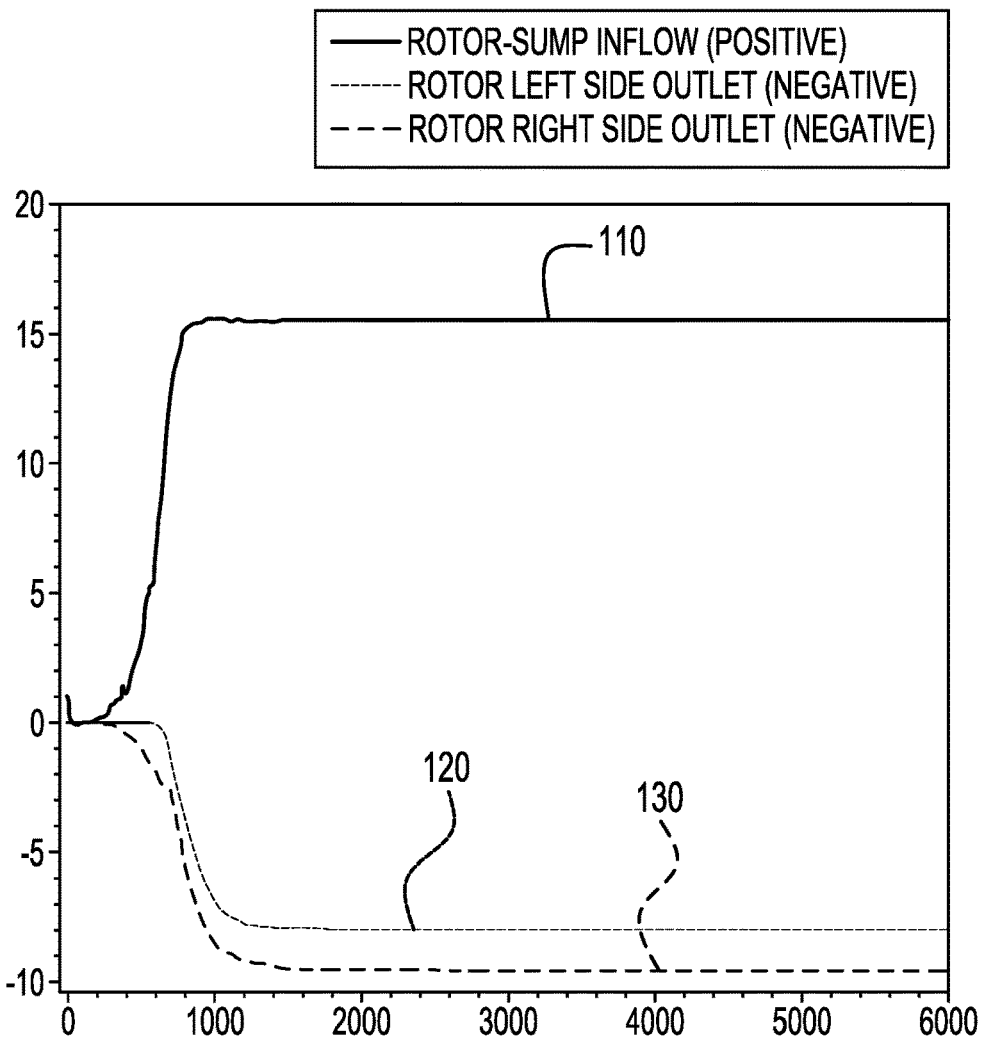
FIG. 5 is a graph showing volumetric flow rates modeled for the electric vehicle drive module.

FIG. 5 presents a graph that demonstrates the increased volumetric flow rate of coolant at the rotor 32 that can be furnished by implementation of the coolant passage 70 in the electric vehicle drive module 10. The plots of FIG. 5 were produced by simulations carried out on a rotor with a coolant passage similar to those described herein. A coolant pump pumping coolant fluid, as described, was included in the simulations. The rotor was simulated at a rotational speed of 5,000 revolutions per minute (RPM). Skilled artisans should appreciate that other simulations may yield other results. In the graph of FIG. 5, the x-axis is an accumulated time step which can represent time in seconds (sec) where 1000=1 sec, 2000=2 sec, 3000=3 sec, 4000=4 sec, 5000=5 sec, and 6000=6 sec. The y-axis represents volumetric flow rate in liters per minute (lpm). A line 110 (rotor-sump inflow (positive)) represents the flow of coolant fluid from the coolant sump and through the coolant passage. A line 120 (rotor left side outlet (negative)) represents the flow of coolant fluid exiting out of the rotor at a left side thereof (left side is used here with reference to the orientation of the electric vehicle drive module 10 in FIG. 2). A line 130 (rotor right side outlet (negative)) represents the flow of coolant fluid exiting out of the rotor at a right side thereof (right side is used here with reference to the orientation of the electric vehicle drive module 10 in FIG. 2).

As demonstrated in the graph, at time 0 sec, there is no flow of coolant fluid. At an approximate time of 0.5 sec, a flow of coolant fluid initiates at the coolant passage and at the left and right sides of the rotor. At an approximate time of 1.0 sec, a flow of coolant fluid of about 15.5 lpm is exhibited at the coolant passage, a flow of coolant fluid of about 7 lpm is exhibited at the left side of the rotor, and a flow of coolant fluid of about 9 lpm is exhibited at the right side of the rotor. Further, at approximate times of 2.0 sec, 3.0 sec, 4.0 sec, 5.0 sec, and 6.0 sec, a flow of coolant fluid of about 15.5 lpm is maintained at the coolant passage, a flow of coolant fluid of about 8 lpm is maintained at the left side of the rotor, and a flow of coolant fluid of about 9.5 lpm is maintained at the right side of the rotor. It is thought that the additional 2.0 lpm of coolant fluid flowing out of the left and right sides of the rotor—relative to that at the coolant passage—is furnished by the coolant pump in the simulations. Moreover, it was observed from the simulations that the coolant passage served a pumping functionality for the flow of coolant fluid to the rotor once the rotor was primed with coolant fluid and coolant fluid fully filled the rotor. The primed state was observed at 5 sec and thereafter. At the primed state, the flow of coolant fluid was maintained at about 15.5 lpm. Enhanced cooling could hence be effected at the rotor and at the stator. All told, implementation of the coolant passage 70 in the embodiments set forth herein was shown to increase volumetric flow rate of coolant fluid through the rotor 32 by about 15 lpm. Furthermore, it has been found that the volumetric flow rate of the coolant fluid 54 through the coolant passage 70 is at least partially a function of the rotational speed of the rotor 32—increased rotational speeds furnish increased volumetric flow rates.

Figure 6:
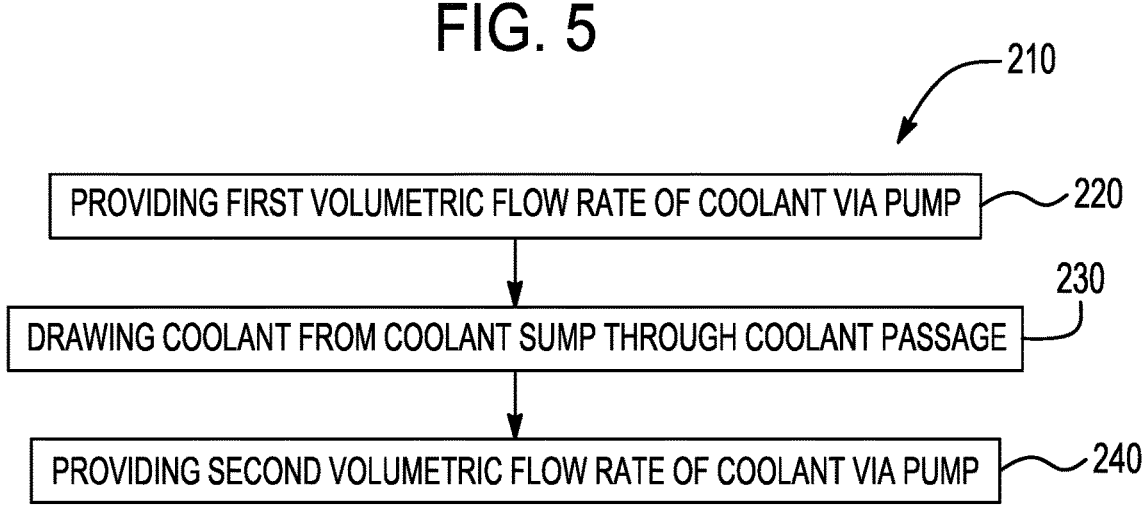
FIG. 6 is a flow chart of an embodiment of a method of providing coolant in an electric motor of the electric vehicle drive module.

The increased volumetric flow rate of the coolant fluid 54 via the coolant passage 70 can supplement the pumped coolant flow of the coolant pump 50, or can be in lieu thereof, according to various embodiments. The coolant pump 50, for instance, could be throttled to decrease the flow rate to the coolant gallery passages 60. With reference now to FIG. 6, an embodiment of a method 210 of providing the coolant fluid 54 in the electric motor 16 is presented. The method 210 involves multiple steps, and could have more, less, and/or different steps than those presented here in other embodiments. In a first step 220, a first volumetric flow rate of the coolant fluid 54 is provided to the electric motor 16 and to the stator 30 and rotor 32 via the coolant pump 50. This can constitute a first operational state of the coolant pump 50. The first step 220 can be carried out in the absence of the coolant fluid 54 being provided to the rotor 32 via the coolant passage 70, per an example. In other words, the coolant pump 50 can pump the coolant fluid 54 at the first volumetric flow rate before the primed state is established in the rotor 32, and thereafter, according to differing examples, and before a second step 230. The second step 230 of the method 210 involves the coolant fluid 54 being drawn from the coolant sump 48 and through the coolant passage 70 by way of the rotation of the shaft 42 and the pressure differential described above. A third step 240 involves providing a second volumetric flow rate of the coolant fluid 54 to the electric motor 16 and to the stator 30 and rotor 32 via the coolant pump 50. This can constitute a second operational state of the coolant pump 50. The second volumetric flow rate can be initiated after the coolant fluid 54 is drawn from the coolant sump 48 and through the coolant passage 70 by way of the rotation of the shaft 42 and the pressure differential described above. That is, the third step 240 can be carried out after the second step 230. The second volumetric flow rate of the third step 240 can have a lesser value than the first volumetric flow rate of the first step 220. Still, other steps of the method 210 can involve ceasing the provision of the coolant fluid 54 via the coolant pump 50. The provision of the coolant fluid 54 can be ceased after the coolant fluid 54 is drawn from the coolant sump 48 and through the coolant passage 70 by way of the rotation of the shaft 42 and the pressure differential. This could involve deactivating the coolant pump 50, where no volumetric flow rate of coolant is being pumped to the electric motor 16. Rather, the coolant fluid 54 is being solely provided to the electric motor 16 via the coolant fluid 54 being drawn from the coolant sump 48 and through the coolant passage 70. Further still, the coolant pump 50 could have other operational states that furnish other volumetric flow rates in other embodiments.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. An electric vehicle drive module, comprising:
a housing;
an electric motor residing within the housing, the electric motor having a stator and a rotor, the rotor having a shaft;
a gear assembly rotationally driven by the shaft;
a coolant sump established in the housing;
a coolant passage residing in a wall of the housing, the coolant passage in fluid communication with the shaft and with the coolant sump, wherein coolant is drawn from the coolant sump and through the coolant passage upon rotation of the shaft; and
a check valve situated in the coolant passage, the check valve permitting coolant flow from the coolant sump and downstream thereof via the coolant passage, and preventing coolant flow to the coolant sump via the coolant passage.

2. The electric vehicle drive module as set forth in claim 1, wherein the wall of the housing is an interior wall of the housing, and the coolant passage resides in the interior wall.

3. The electric vehicle drive module as set forth in claim 2, wherein the interior wall is situated axially between the electric motor and the gear assembly.

4. The electric vehicle drive module as set forth in claim 1, wherein the wall of the housing is an end wall of the housing, and the coolant passage resides in the end wall.

5. The electric vehicle drive module as set forth in claim 1, further comprising a lower pressure zone, the lower pressure zone contiguous with the shaft and being in fluid communication with the coolant passage.

6. The electric vehicle drive module as set forth in claim 1, further comprising a second coolant passage residing at the shaft, the coolant passage in fluid communication with the second coolant passage.

7. The electric vehicle drive module as set forth in claim 6, wherein the second coolant passage resides in the shaft.

8. The electric vehicle drive module as set forth in claim 1, wherein coolant drawn from the coolant sump and through the coolant passage travels through a downstream coolant circuit of the electric motor.

9. The electric vehicle drive module as set forth in claim 1, further comprising a pump in fluid communication with the coolant sump, the pump providing coolant from the coolant sump and to a coolant circuit of the electric motor, the pump having a first operational state when there is an absence of coolant being drawn from the coolant sump through the coolant passage, and the pump having a second operational state when coolant is drawn from the coolant sump and through the coolant passage.

10. The electric vehicle drive module as set forth in claim 9, wherein the first operational state of the pump provides a greater volumetric flow rate of coolant to the cooling circuit than that of the second operational state.

11. A method of providing coolant in an electric motor of an electric vehicle drive module, the method comprising:
providing a first volumetric flow rate of coolant to the electric motor via a pump, the pump pumping coolant from a coolant sump of the electric vehicle drive module and to a coolant circuit of the electric motor;
drawing coolant from the coolant sump through a coolant passage via rotation of a rotor shaft of the electric motor, the coolant passage in fluid communication with the coolant circuit; and
providing a second volumetric flow rate of coolant to the coolant circuit via the pump after coolant is drawn from the coolant sump through the coolant passage via rotation of the rotor shaft of the electric motor, the second volumetric flow rate of coolant being less than the first volumetric flow rate of coolant.

12. The method of providing coolant in the electric motor of the electric vehicle drive module as set forth in claim 11, wherein providing the first volumetric flow rate of coolant to the electric motor via the pump occurs in the absence of coolant being drawn from the coolant sump through the coolant passage.

13. The method of providing coolant in the electric motor of the electric vehicle drive module as set forth in claim 11, further comprising ceasing the provision of coolant to the coolant circuit via the pump after coolant is drawn from the coolant sump through the coolant passage via rotation of the rotor shaft of the electric motor, and solely providing coolant to the coolant circuit via the coolant passage.

14. The method of providing coolant in the electric motor of the electric vehicle drive module as set forth in claim 11, further comprising fluidly communicating lower pressure produced upon rotation of the rotor shaft of the electric motor with the coolant passage.

15. The method of providing coolant in the electric motor of the electric vehicle drive module as set forth in claim 11, further comprising communicating the coolant sump with the rotor shaft via the coolant passage.

16. An electric vehicle drive module, comprising:
a housing having an interior wall, an end wall, or both the interior wall and the end wall;
an electric motor residing within the housing, the electric motor having a stator and a rotor, the rotor having a shaft;
a gear assembly rotationally driven by the shaft;
a coolant sump established in the housing;
a coolant passage residing in the interior wall, in the end wall, or in both the interior wall and the end wall, the coolant passage in fluid communication with the coolant sump and with a coolant circuit of the electric motor;
a lower pressure zone contiguous with the shaft, the lower pressure zone in fluid communication with the coolant passage; and
a pump in fluid communication with the coolant sump, the pump pumping coolant from the coolant sump and to the coolant circuit of the electric motor, wherein the pump has a first operational state when there is an absence of coolant being drawn from the coolant sump through the coolant passage, and the pump has a second operational state when coolant is being drawn from the coolant sump through the coolant passage, the first operational state of the pump providing a greater volumetric flow rate of coolant to the cooling circuit than that of the second operational state.

17. The electric vehicle drive module as set forth in claim 16, wherein lower pressure at the lower pressure zone draws coolant from the coolant sump and through the coolant passage.

18. The electric vehicle drive module as set forth in claim 16, further comprising a check valve situated in the coolant passage.

* * * * *